United States Patent
Yik et al.

(10) Patent No.: US 7,085,704 B2
(45) Date of Patent: Aug. 1, 2006

(54) TIME-INDEXED MULTIPLEXING AS AN EFFICIENT METHOD OF SCHEDULING IN HARDWARE

(75) Inventors: James Yik, Mission Viejo, CA (US); Craig Barrack, Irvine, CA (US)

(73) Assignee: Zarlink Semicorporation V.N. Inc., Irvine, CA (US)

( * ) Notice: Subject to any disclaimer, the term of this patent is extended or adjusted under 35 U.S.C. 154(b) by 251 days.

(21) Appl. No.: 10/139,644

(22) Filed: May 7, 2002

(65) Prior Publication Data

US 2004/0003020 A1 Jan. 1, 2004

(51) Int. Cl.
*G06F 9/44* (2006.01)
*H04L 12/28* (2006.01)

(52) U.S. Cl. .................. 703/19; 709/226; 370/230; 370/395.4; 700/99; 718/105

(58) Field of Classification Search .............. 703/2, 703/19, 14; 700/99; 709/226, 240, 229, 225; 370/230, 395.4, 412, 429; 718/102; 725/115
See application file for complete search history.

(56) References Cited

U.S. PATENT DOCUMENTS

| | | | |
|---|---|---|---|
| 6,167,049 A | | 12/2000 | Pei et al. |
| 6,377,546 B1 | * | 4/2002 | Guerin et al. ............... 370/230 |
| 6,643,298 B1 | * | 11/2003 | Brunheroto et al. ........ 370/537 |
| 6,728,253 B1 | * | 4/2004 | Jeffries et al. .............. 370/412 |
| 6,775,293 B1 | * | 8/2004 | Robotham et al. .......... 370/412 |
| 6,804,767 B1 | * | 10/2004 | Melvin ........................ 711/216 |
| 2002/0136406 A1 | * | 9/2002 | Fitzhardinge et al. |
| 2003/0081624 A1 | * | 5/2003 | Aggarwal et al. |
| 2004/0008715 A1 | * | 1/2004 | Barrack et al. |

FOREIGN PATENT DOCUMENTS

| | | |
|---|---|---|
| WO | WO 00/26829 A1 | 5/2000 |
| WO | WO 02/33547 A1 | 4/2002 |

OTHER PUBLICATIONS

Krishnamurthy, R., et al., "A network co-processor-based approach to scalable media streaming in servers", *IEEE*, 2000, pp. 125–134.

* cited by examiner

*Primary Examiner*—Thai Phan
(74) *Attorney, Agent, or Firm*—Rothwell, Figg, Ernst & Manbeck, PC (57) ABSTRACT

Methods and apparatus for hardware scheduling processes handling are presented. The apparatus includes a table of task lists. Each task list has specifications of processes requiring handling during a corresponding time interval. Each task list is parsed by a scheduler during a corresponding interval and the processes specified therein are handled. The methods of process handling may include a determination of a next time interval in which the process requires handling and inserting of process specifications in task lists corresponding to the determined next handling times. Implementations are also presented in which task lists specify work units requiring handling during corresponding time intervals. The entire processing power of the scheduler is used to schedule processes for handling. Advantages are derived from an efficient use of the processing power of the scheduler as the number of processes is increased.

16 Claims, 10 Drawing Sheets

TIME-INDEXED MULTIPLEXING AS AN EFFICIENT METHOD OF SCHEDULING IN HARDWARE

FIELD OF THE INVENTION

The invention relates to hardware solutions for scheduling of processes, and in particular to methods and apparatus for scheduling timely data processing of streaming data services.

BACKGROUND OF THE INVENTION

One of the most common challenges facing hardware system designers is the coordination of event scheduling for a large number N of processes. Each one of the N processes has a "next event time" when that process needs to be handled. In the art, "handling" includes, but is not limited to: short duration event specific processing as well as the initiation of long duration data processing. An event scheduler is used to initiate handling for respective processes at appropriate corresponding times.

For hardware event scheduling implementations, it is common to identify processes requiring handling at appropriate corresponding times by repetitive scanning through information. Upon each tick of a clock signal information associated with all processes is scanned to identify events to be handled. Such traditional methods may be satisfactory for application scheduling a relatively small number of processes making use of a given handling speed (low density applications). However, as the number N of processes to be scheduled increases while the handling speed is kept the same (high density applications), such solutions become less and less viable. A frequently observed impediment with the scanning approach is the tight time budget available to scan through the information. As the number of processes N becomes large or as the time budget becomes small, such solutions prove to be unscalable.

To alleviate the scalability issue, hardware system architects typically opt to divide the N processes into m groups of size N/m, and devote a scanning scheduler to each N/m group of processes. Although providing a measure of relief, as the number of processes N increases so must m increase to compensate. This means that m scanning scheduler implementations must be used to scan in parallel which represents a large expenditure of hardware logic. Either the hardware costs of parallelism become too high, or the time budget for handling each process becomes too small therefore leading to unscalable solutions.

Although the hardware scheduling of multiple processes spans a wide variety of applications, the invention will be presented herein with respect to convergent technologies and products, and in particular with respect to telephony applications addressing a current need in the market. Convergent technologies concern the merging of voice, data, and video provisioning over the same data transport network by integrating telecommunications and computer technologies.

In support of telephony applications, an exemplary data streaming service, the Voice-over-Internet Protocol (VoIP) service may be employed. VoIP technologies are used for provisioning telephone-quality sessions over packet-switched data transport networks. Exemplary data-stream processing equipment provisioning VoIP services includes: switching nodes, routers, multiplexers, demultiplexers, mixers, etc. of particular mention are VoIP telephony convergent products which require the handling of a large number of voice data streams, where the handling includes at least the initiation of timed audio playback of voice data samples.

From a hardware implementation perspective, each voice data stream is referred to as a process which needs to be handled by timely processing data associated therewith. Timely playback of the data requires scheduling. Hardware solutions to efficient playback scheduling are sought for provisioning a large number of telephone sessions in an efficient and scalable manner at higher and higher stream densities driven by an increased demand for provisioned services. Factors to be considered include: timing information embedded in the conveyed data stream and therefore not available for a priori scheduling, and a likely possibility that the voice data conveyed in packets associated with each data stream is not conveyed sequentially.

Figure 1:
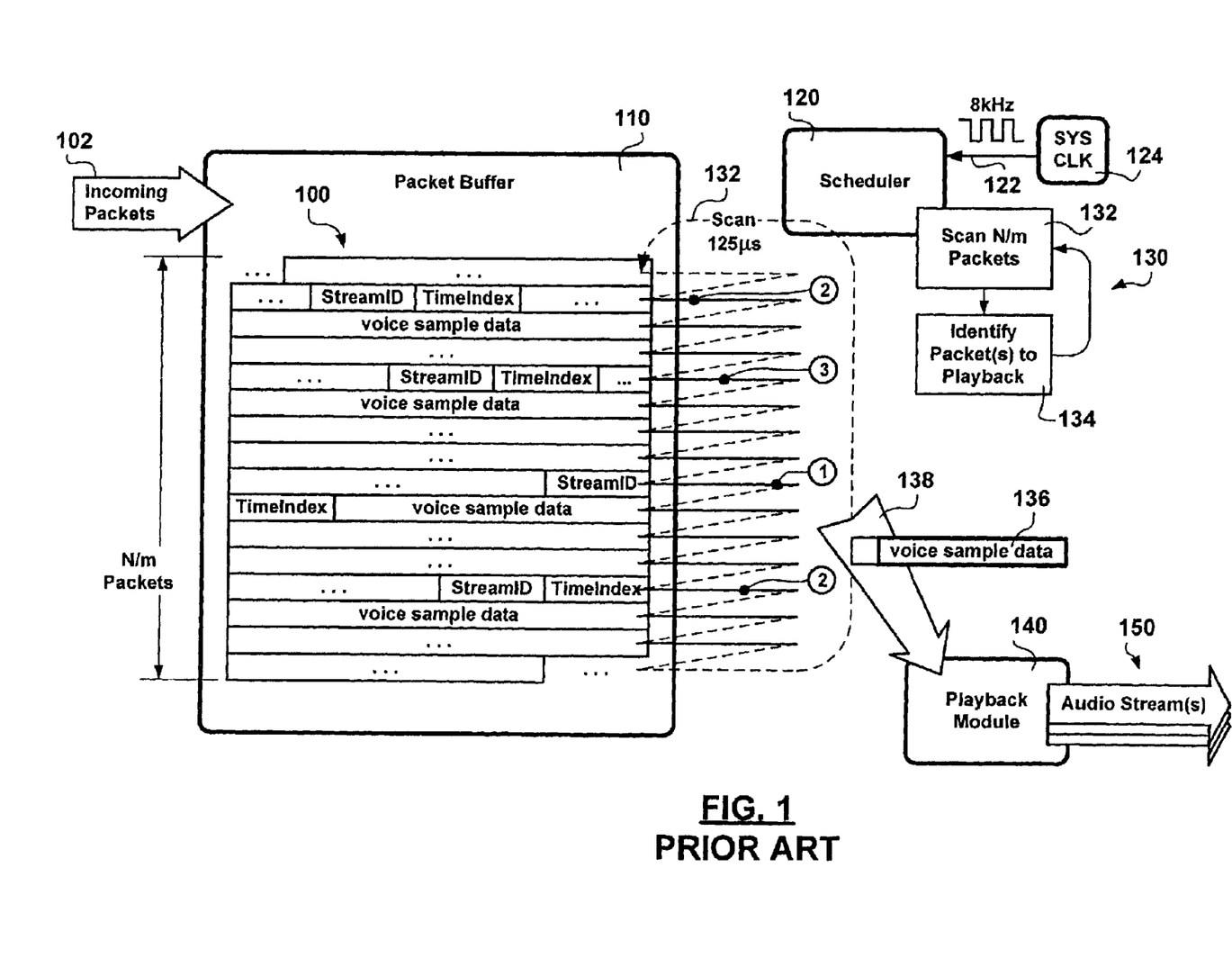
FIG. 1 is a schematic diagram showing a prior art implementation of an apparatus scheduling processes for handling.

A simple exemplary prior art method of multi-process scheduling is presented in FIG. 1. Incoming VoIP packets 100 are received 102 via an associated packet-switched data transport network (not shown). The packets 100, conveying VoIP data, are typically buffered in a packet buffer 110.

Each packet has a header and a payload. The VoIP packet payload carries voice sample data. Information conveyed in the VoIP packet header is used to derive a voice stream identification (streamID) to associate the payload of the VoIP packet with a particular voice data stream. Each VoIP packet header further specifies a data-stream segment time-index value to sequence the payload with respect to the particular voice data stream. The header may implicitly specify the streamID. The streamID may be determined by classifying the packet based on packet header fields such as the Internet Protocol (IP) address, User Datagram Protocol (UDP) port number, etc.

Ultimately the voice sample data conveyed by the VoIP packets is played back to a human. In accordance with the exemplary data streaming service presented, voice samples are generated and have to be played back at 125 μs intervals. The human auditory system provides some degree of flexibility in interpreting played back audio signals.

Therefore in accordance with a prior art multi-process scheduling implementation presented, a scheduler 120 is responsive to a 8 kHz clock signal 122 from a system clock 124. The 8 kHz clock signal divides the operation of the scheduler 120 into 125 μs intervals. During each 125 μs interval, the scheduler 120 performs a search 130. The search 130 scans 132 the contents of the packet buffer 110 and identifies 134, based on VoIP packet header time index values, which voice sample data 136 needs to be provided 138 to a playback module 140 for playback. As multiple streams are to be handled simultaneously in support of multiple simultaneous telephone sessions, it is expected that multiple processes may be required to start playback during the same 125 μs interval. A handling sequence generated by three consecutive scans 132 is presented schematically in FIG. 1 where: one packet (1) is identified for handling in the first scan, two packets (2) are identified for handling in the second scan, and one packet (3) is identified for handling in the third scan.

The playback module 140 is provided 138 with the identified packets 136 requiring handling. The playback module 140 makes use of the streamID information associated with the identified packets to associate with, and play back the voice samples in connection with, respective audio streams for respective telephone sessions. The contents of the identified packets begin playback subsequent to having been identified and continue playback during subsequent 125 μs time intervals simultaneously with other voice sample data until all voice data samples conveyed by respective packets have been played back. The operation of the playback module 140 is beyond the scope of the present description and described elsewhere. The playback module 140 is responsible for freeing up storage space held by packets after having been played back.

In accordance with the simple search 130 presented with respect to the exemplary prior art implementation, the scheduler 120 inspects the entire contents of the packet buffer 110. All of the packets 100 are inspected during each scan 132 regardless of whether they require handling or not. The packet buffer 110 may contain more than one VoIP data packet per VoIP data stream (telephone session).

It is very likely in employing packet-switched data transport that packets arrive out of sequence. The large overhead incurred by the repetitive scanning 132 does provide a benefit of identifying packets to be handled in the correct sequence without actively sorting the received packets. Repetitive scanning 132 takes care of sequencing packets received out of sequence.

The above search 130 example is rather simplistic but is intended to present the relevant principles. It is understood in the art that the information sought by the scan 132 is found solely in packet headers. Therefore only packet headers are scanned 132 to identify the next packets to be played back. It is understood that the packet header scanning 132 incurs an overhead in keeping track of memory storage locations where the packet headers are to be found. Keeping track of packet header storage locations is typically implemented via a table lookup.

The time taken to perform such a search 130 therefore increases with the total number of VoIP packets stored in the buffer and therein lies a scalability problem. In using the term "scalability problem" it is understood that: using the scheduler 120 to scan 132 the entire contents of the packet buffer, will be less and less of a viable solution with increased throughput of data, in support of more simultaneous telephone sessions.

An observed problem is that many packet headers are inspected unnecessarily as more than one data packet having the same streamID is typically stored in the packet buffer 110. Therefore as packet throughput is increased, in support of a greater number of simultaneous telephone sessions, it becomes more and more difficult to scan packet headers during the 125 μs interval.

In order to be able to handle more data packets in support of more data streams (telephone sessions), it is necessary to utilize multiple m arrangements shown in FIG. 1 in parallel. The parallel scheduling of data streams would further suffer from an incurred processing overhead in distributing the incoming packets 102 over the m packet buffers 110.

Put another way, relevant indicia of the operation of such implementations is the number of packets K stored in the packet buffer 110. The overhead incurred in scanning 130 the packet buffer 110 varies proportionally with K. The overhead may be distributed using multiple arrangements m. The processing overhead required in implementing the above is said to be Order(K/m) where K/m represents the amount of data per packet buffer or the number of data packets per packet buffer respectively. It will be noted that in accordance with these implementations, the number of actually provisioned data stream processes (telephone sessions) N is not equal to K.

Therefore the scanning 132 of the entire packet buffer 110 is considered impractical for VoIP telephony applications but may be a viable hardware scheduling solution for other applications.

Figure 2:
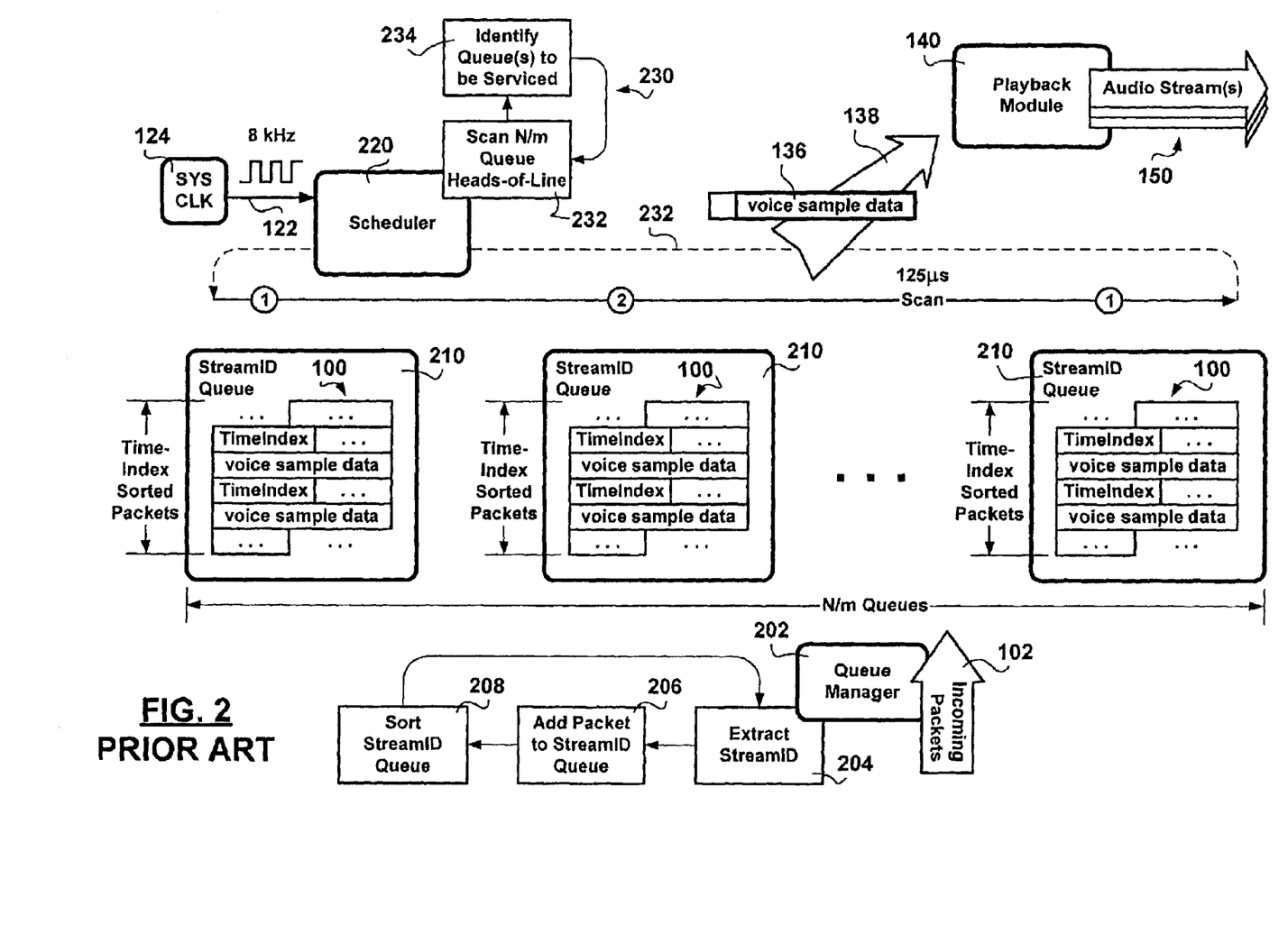
FIG. 2 is a schematic diagram showing another prior art implementation of another apparatus scheduling processes for handling.

In accordance with yet another prior art improvement presented in FIG. 2, the incoming VoIP packets 102 are pre-processed by a queue manager 202. The queue manager 202 operates in conjunction with queues 210, each of which is associated with an individual VoIP data stream (telephone session). The queue manager 202, upon receipt of each VoIP packet, derives 204 the streamID specified in the packet header, adds 206 the VoIP packet to the corresponding queue 210, and sorts 208 the packets stored in the streamID queue 210 with respect to time index values thereof. The sorting of stream queues 210 is necessary and re-sequences packets 102 arriving out of sequence, as is typically the case.

Although the sorting of the queue 210 is presented herein for easy understanding of the relevant concepts, in practice, such a necessary step is considered to introduce large processing overheads. Typically the same result is achieved by inserting memory address references to the newly stored received packet into a list of references sorted according to corresponding packet time index values. The implementation of the list of references requires additional resources. The implementation further suffers from independent multi-queue storage reservations which were otherwise consolidated in the implementation presented above.

The arrangement presented in FIG. 2, enables a scheduler 220 to inspect only one packet per VoIP stream in identifying data streams requiring handling during a 125 μs interval. The pre-processing performed by the queue manager 202 enables the scheduler 220 to scan only the heads-of-line of the time-index sorted streamID queues 210.

Even with the improvement presented above, the 125 μs time budget still provides a limit as to how many streamID queues 210 can be scanned 232. For example, as the scheduler 202 scans 232 all N stream queues 210: only two streams (1) are found to require handling during a first 125 μs interval, and one stream (2) is found to require handing during a second 125 μs interval. A large overhead is therefore incurred in inspecting stream queues 210 which do not require handling during a particular 125 μs interval. This implementation is regarded as non-scalable for this very reason as well. Additional data stream handling capacity may be provided by using multiple m arrangements such as shown in FIG. 2.

Put another way, relevant indicia of the operation of such an implementation is the number N of stream queues 210. The overhead incurred in scanning 232 varies proportionally with N. The overhead may be distributed using multiple arrangements m. The processing overhead required in implementing the above is said to be Order(N/m) where N/m is the number of stream queues 210 per arrangement.

The above presented prior art implementations suffer from the need of redevelopment as additional VoIP data stream handling capacity is needed thereby further contributing to the scalability problem.

There therefore is a need to solve the above mentioned non-scalability issues.

SUMMARY OF THE INVENTION

It is an object of the invention to overcome the shortcomings of the prior art.

In accordance with a first embodiment of the invention, a scheduling apparatus is provided. The scheduling apparatus includes time indexed storage for retrievably storing a plurality of time sequenced task lists. Each task list specifies at least one work unit to be handled during a time interval corresponding to the task list. The scheduling apparatus further includes work unit storage and a scheduler. The work unit storage retrievably stores at least one work unit. During a particular time interval, the scheduler handles at least one work unit specified in a corresponding task list.

In accordance with a feature of the first embodiment of the invention, the scheduling apparatus further includes a selector. The selector is responsive to a clock signal and selects a task list during a corresponding time interval.

In accordance with another feature of the first embodiment of the invention, the scheduling apparatus further includes a process roster. The process roster has a entries specifying a plurality of processes to be scheduled for handling. Each process has an associated time sequenced list of work units associated therewith. The scheduler in handling the at least one work unit, handles a head-of-line work unit in the time sequenced list.

In accordance with a second embodiment of the invention, a scheduling apparatus is presented. The scheduling apparatus includes: a time indexed table, a work unit storage buffer, a process indexed table and a scheduler. The time indexed table has task list entries. Each task list entry references a corresponding task list. Each task list has task list elements. Each task list element specifies a process to be handled during a corresponding time interval. The work unit storage buffer holds a plurality of work units. The process indexed table has process entries. Each process entry has a list of time sequenced work units associated therewith. Each work unit holds a specification of a handling time. The scheduler parses one task list during a corresponding time interval and causes the initiation of handling of head-of-line work units corresponding to processes specified in the task list. Once handling for each head-of-line work unit has been initiated, the handling time associated with a subsequent work unit is used to reschedule the corresponding process in the time indexed table for subsequent handling.

In accordance with a third embodiment of the invention, a scheduling apparatus is presented. The scheduling apparatus includes a time indexed table, a work unit storage buffer, and a scheduler. The time indexed table has time sequenced task list entries. Each task list entry references a corresponding work unit list. Each work unit list has work unit list elements. Each work unit list element specifies a work unit to be handled during a corresponding time interval. The work unit storage buffer holds a plurality of work units. Each work unit specifies a handling time. The scheduler parses one work unit list during a corresponding time interval, to cause the initiation of handling of work unit specified in the work unit list.

In accordance with a fourth embodiment of the invention, a method of scheduling a plurality of work units for handling is provided. Each work unit is associated with one of a plurality of time sequenced task lists for handling thereof during a time interval specified by a time index specification corresponding to the work unit. A task list is selected and handing is initiated for each work unit in the selected task list.

In accordance with a fifth embodiment of the invention, a method of scheduling a plurality of processes for handling is provided. Each one of a plurality of work units is associated with a corresponding process. The work units associated with each process are sequenced. A task list specifying a plurality of processes to be handled during a particular time interval is selected from plurality of task lists. Handling for each process in the selected task list is initiated. Subsequent to handling each process, the process is associated with anther task list for subsequent handling based on a time index specifications corresponding to work units associated with the handled process.

Advantages are derived from an efficient use of the processing power of the scheduler as the number of processes is increased. The hardware scheduling solution is simple, efficient and scalable.

BRIEF DESCRIPTION OF THE DRAWINGS

The features and advantages of the invention will become more apparent from the following detailed description of the preferred embodiment(s) with reference to the attached diagrams wherein:

FIG. 3 (made up of FIG. 3A and FIG. 3B) is a schematic diagram showing exemplary process steps and an exemplary implementation of an apparatus scheduling a large number of processes for handling in accordance with an exemplary embodiment of the invention;

It will be noted that in the attached diagrams like features bear similar labels.

DETAILED DESCRIPTION OF THE EMBODIMENTS

Figure 3A:
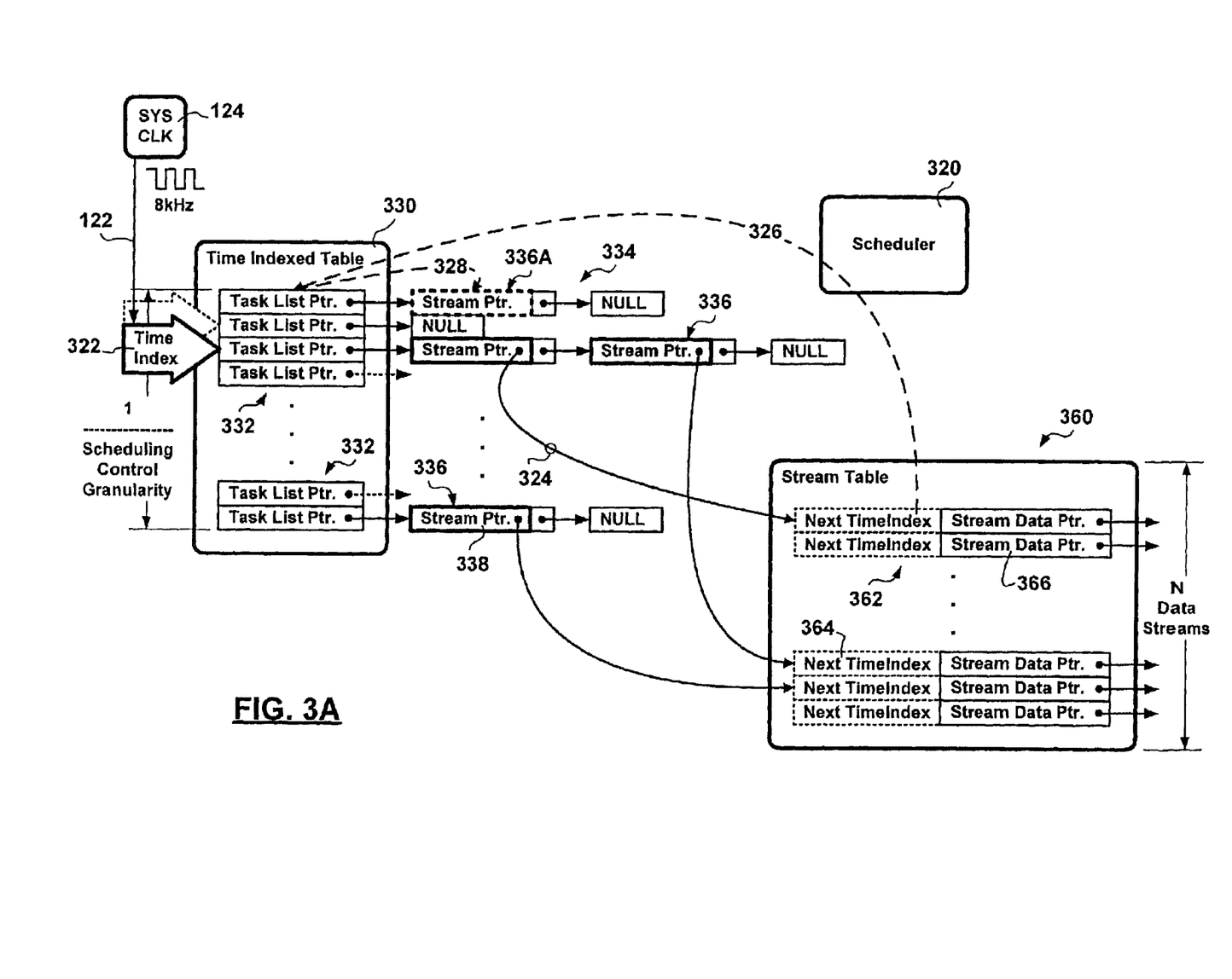

FIG. 3 is a schematic diagram showing, in accordance with an exemplary embodiment, process steps and an implementation of an apparatus scheduling a large number of processes for handling.

In accordance with the exemplary embodiment of the invention, the scheduler 320 is relieved from the overhead of identifying processes to be scheduled for handling during the current 125 µs interval. Therefore the entire processing power of the scheduler 320 is dedicated, during the 125 µs time budget, to process data stream information for handling the corresponding data streams.

The 8 kHz clock signal 122 is used to advance a time index pointer 322 into a time indexed table 330 having entries 332. On reaching the end of the time indexed table 330, the time index pointer 322 jumps back up to the top of the time index table 330 (rolls over). Each entry 332 is populated with a reference (pointer) to a task list 334. Each task list 334 may be implemented in a variety of ways. The exemplary null-terminated linked-list 334 implementation presented herein is not intended to limit the invention thereto.

Each task list 334 includes task list elements 336. Each task list element 336 has a data structure having entries specifying at least a stream scheduled for handling during the corresponding 125 µs interval. The task list element 336 may further hold a reference (pointer) to a next task list element 336 in the task list 334. Each stream specification includes a reference (pointer) 338 to a data stream. Each one of the stream pointers 338 points to an entry 362 of a stream table 360.

During each 125 µs interval, the scheduler 320 reads the task list 334 specified by the time index pointer 322. For each entry 336 in the task list 334, the scheduler 320 uses the pointer specification 338 to access 324 entries 362 of the stream table 360. All processes corresponding to entries 336 of a task list 334 are handled by the scheduler 320 during the 125 µs time interval.

In accessing 324 each entry 362 in the stream table 360, the scheduler 320 causes the initiation of handling of voice sample data for playback. A next time is determined during which that particular stream will require handling again. A corresponding entry 332 in the time indexed table 330 corresponding to the next interval in which the stream will require handling again is found 326. And, a task list entry 336A is inserted 328 into the corresponding task list 334.

Subsequent task list entries 336 are inserted in task lists 334 to be handled after the currently processed task list 334 by looping around from the top of the time index table 330 if necessary. The time index table 330 has a number of entries 332. In general, the number of entries 332 has a reciprocal correspondence to a desired scheduling control granularity.

Care must be taken in selecting the size of time index table 330 so that the subsequent task list entry 336 insert is not looped around and over the currently processed task list 334. The flexibility of the human hearing system in interpreting played back sound alluded to above and a variety of other factors associated with the generation, conveyance and processing of VoIP packets using contemporary equipment, afford the conveyance of about 32 ms of voice data—256 voice samples—in a VoIP packet. A relatively high bandwidth overhead is incurred by conveying fewer than about 256 voice samples per packet. A lower quality-of-service is perceived in using more than about 256 voice samples as early generated voice samples have to wait for transmission before the later voice samples are generated. It is pointed out that the above presented exemplary operational values strike a balance between bandwidth utilization efficiency and perceived quality-of-service using contemporary methods on contemporary data processing equipment. Bandwidth overhead is understood in the larger sense to include, but not limited to: transport bandwidth, buffer storage capacities, packet processing bandwidth, voice sample processing bandwidth, etc. It is understood that other applications are subject to other operational values affecting process scheduling in a similar manner.

In accordance with the exemplary embodiment, if a packet can convey 256 voice data samples, then the time index table 330 can be at least 256 entries (332) long. The general invention is not limited to a time indexed table 330 having 256 entries; generally, design choice is used in selecting a table size.

It is to be noted that only one reference 338 to each (process) data stream to be handled is kept in the time index table 330. This coupled with the fact that the entire processing power of the scheduler 320 is devoted to process handling makes for very efficient hardware process scheduling.

Figure 3B:
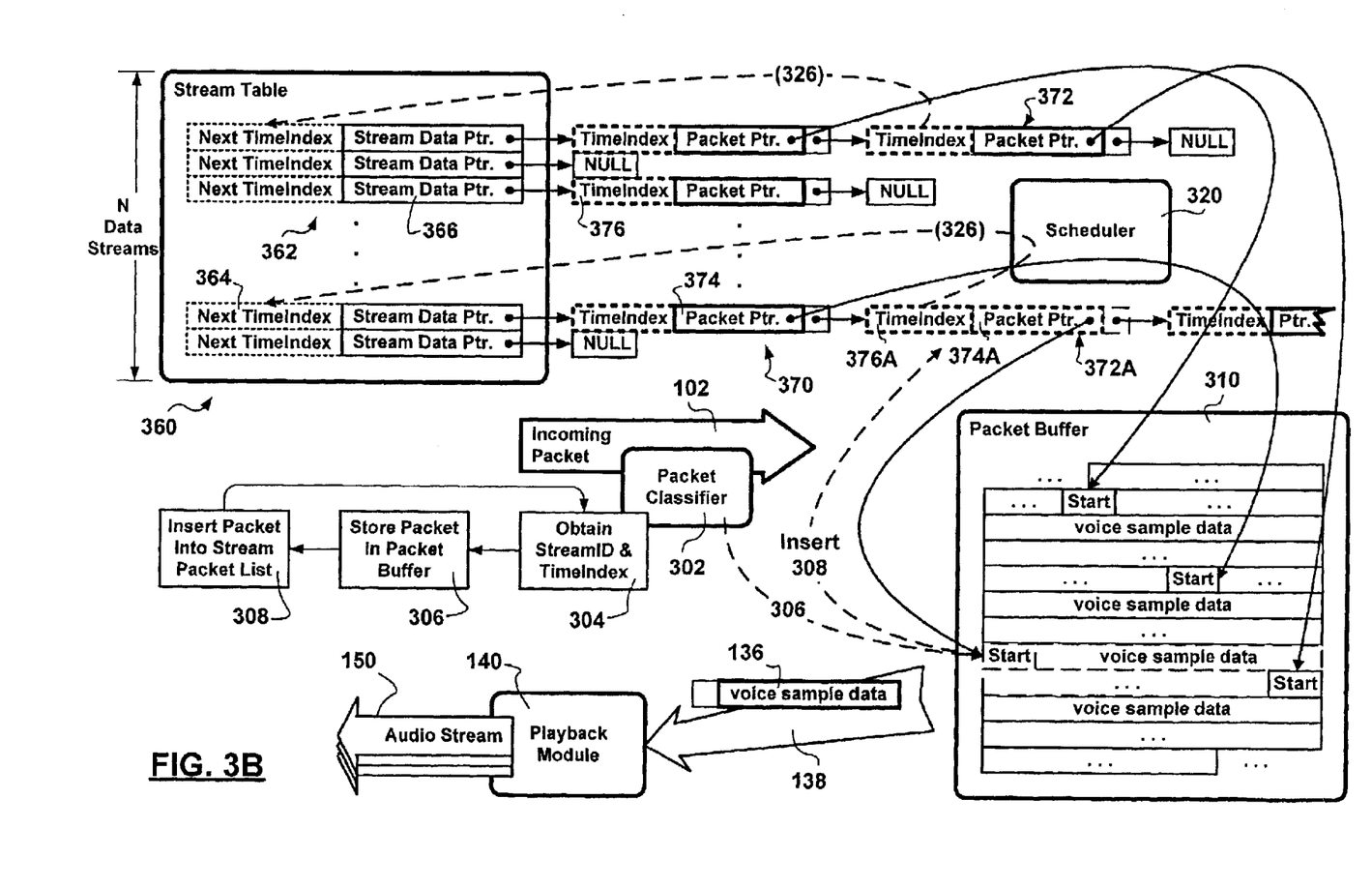

The process handling is presented in more detail in FIG. 3B. Each stream table entry 362 is shown to further have a next time index specification 364 which is used to determine the next 125 µs time interval during which the stream will require handling again. Each stream table entry 362 further specifies a reference 366 to a list of received packets 370 associated with the data stream. Each list of received packets 370 includes packet list elements 372. The reference 366 points to the head-of-line packet list element 372. Each packet list element 372 has a data structure having entries specifying at least a memory address reference 374 of a corresponding packet received and stored preferably in a global packet buffer 310. The packet list element 372 may further hold a reference (pointer) to a next packet list element 372. The packet list element 372 may further hold the time index specification 374 of the corresponding packet.

As the head-of-line packet specified in the packet list 370 is handled, the time index of the next packet may be written 326 in the corresponding stream table entry 362. The next time index specification may also be updated by a receipt of a new packet.

A packet classifier 302 is shown to pre-process incoming packets 102. The packet classifier 302, derives streamID information and extracts time index information from each received packet (304). Preferably the inspected packet is stored 306 in the global packet buffer 310 to consolidate storage resources. The extracted streamID information is used to determine a corresponding stream specified in the stream table 360. The extracted time index information is used to pace through the stream packet list 370 to sequence the newly received packet with respect to other packet list entries 372 thus reordering packets received out of sequence. A new packet list entry 372 is inserted 308 in the packet list 370. An associated start memory storage location of the just stored packet is used to populate the packet reference specification 374A of the new stream packet list entry 372A. The time index specification extracted from the received packet is also used to populate the time index specification 376A of the new packet list entry 372A. If the packet just received becomes the second packet in the packet list 370 the time index just extracted is also written 326 to the corresponding stream table 360 entry 362.

Packets inspected by the packet classifier 302 may be received late, fact determined from the extracted time index value specifying a value prior to that of the head-of-line packet in the corresponding packet list 370. In such a case, the late received packet may be sent directly to the playback module 140. Whether the late received packet is played back or dropped depends on the prescribed operation of the playback module 140.

The arrangement as described works well for steady state voice data conveyance and playback. However, every telephone session has a beginning and an end. The beginning and the end of the telephone session is effected through set-up and tear-down signaling respectively. Appropriate signals, specified in VoIP packet headers are extracted and used by the packet classifier 302 to cause the creation or deletion of entries 362 in the stream table 360, and to schedule new entries 336 in the time index table 330 for handling thereof.

Figure 4:
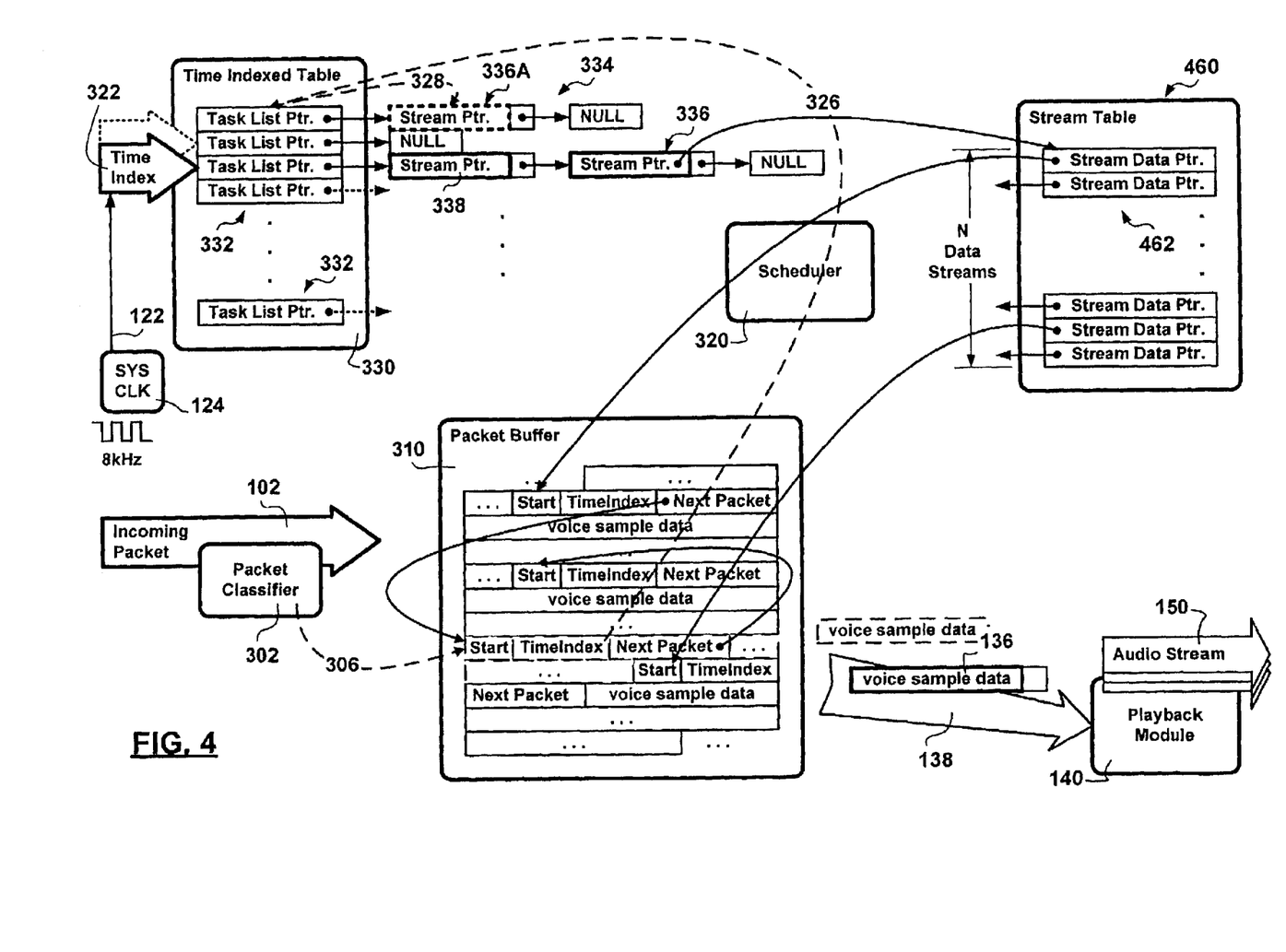
FIG. 4 is a schematic diagram showing another exemplary implementation of an apparatus scheduling a large number of processes for handling in accordance with another exemplary embodiment of the invention.

FIG. 4 is another schematic diagram showing, in accordance with another exemplary embodiment of the invention, an exemplary implementation of an apparatus scheduling a large number of processes for handling.

In accordance with this exemplary implementation, each stream table 460 entry 462 references the start memory address of the head-of-line data packet to be handled corresponding to the stream represented by the entry 462. Time index information is stored with the packet as well as a next packet specification. The next packet specification holds a start memory address of a received subsequent data packet associated with the stream.

Figure 5:
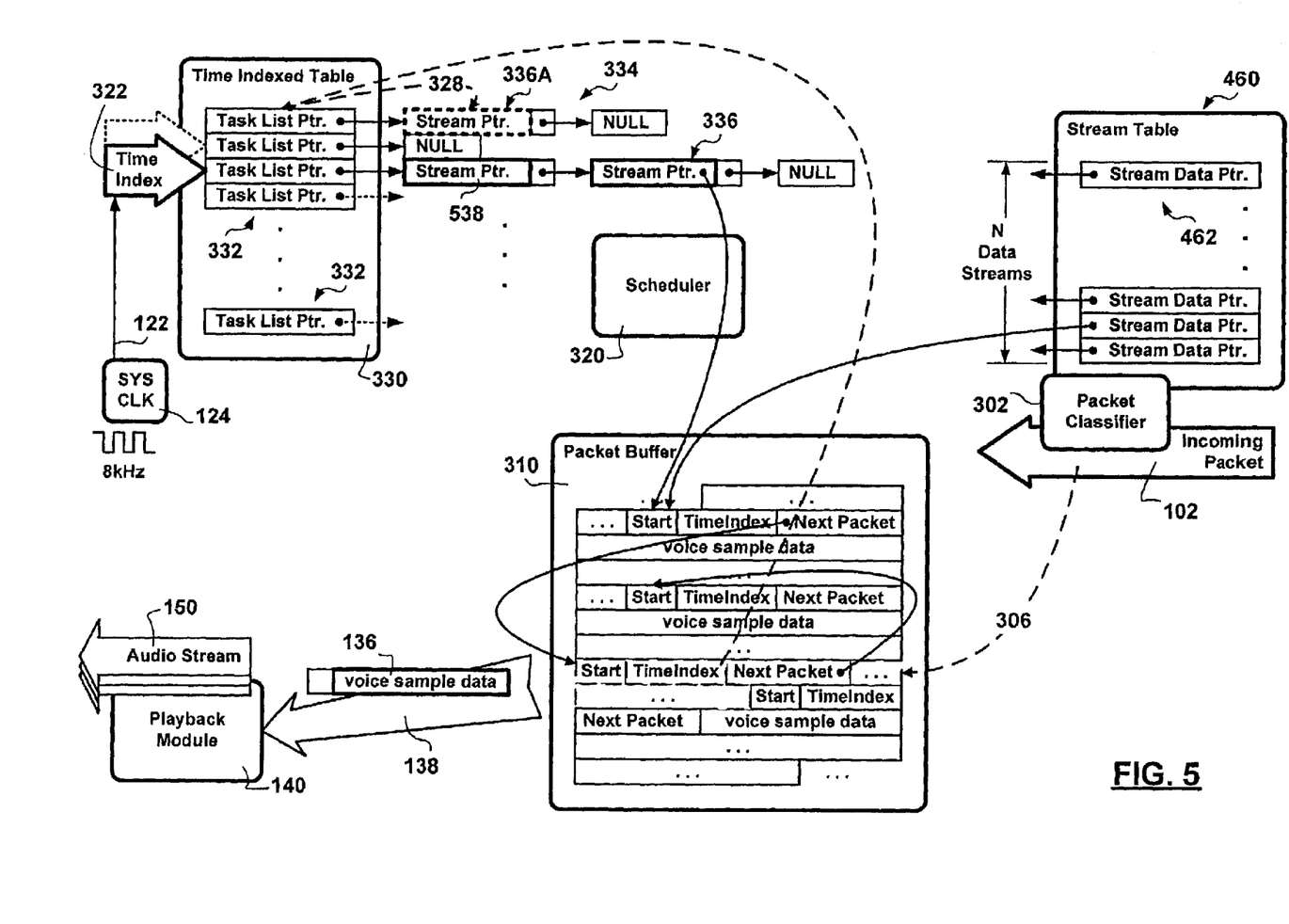
FIG. 5 is a schematic diagram showing a further exemplary implementation of an apparatus scheduling a large number of processes for handling in accordance with a further exemplary embodiment of the invention.

In receiving a data packet, the packet classifier 302 uses the streamID information and time index information extracted therefrom, to search the stream table 460 for the start memory address reference of the head-of-line packet to be handled for the stream. Once the head-of-line packet in the stream is found, the time index information is used to sequence the just received packet with respect to the previously received packets associated with the stream. FIG. 5 shows yet another implementation in which the stream pointers 538 of the task lists 334 point directly to the start memory address of the head-of-line packets to be handled for each corresponding stream. The stream table 460 is being used mainly by the packet classifier 302 to pre-process received packets.

Figure 6:
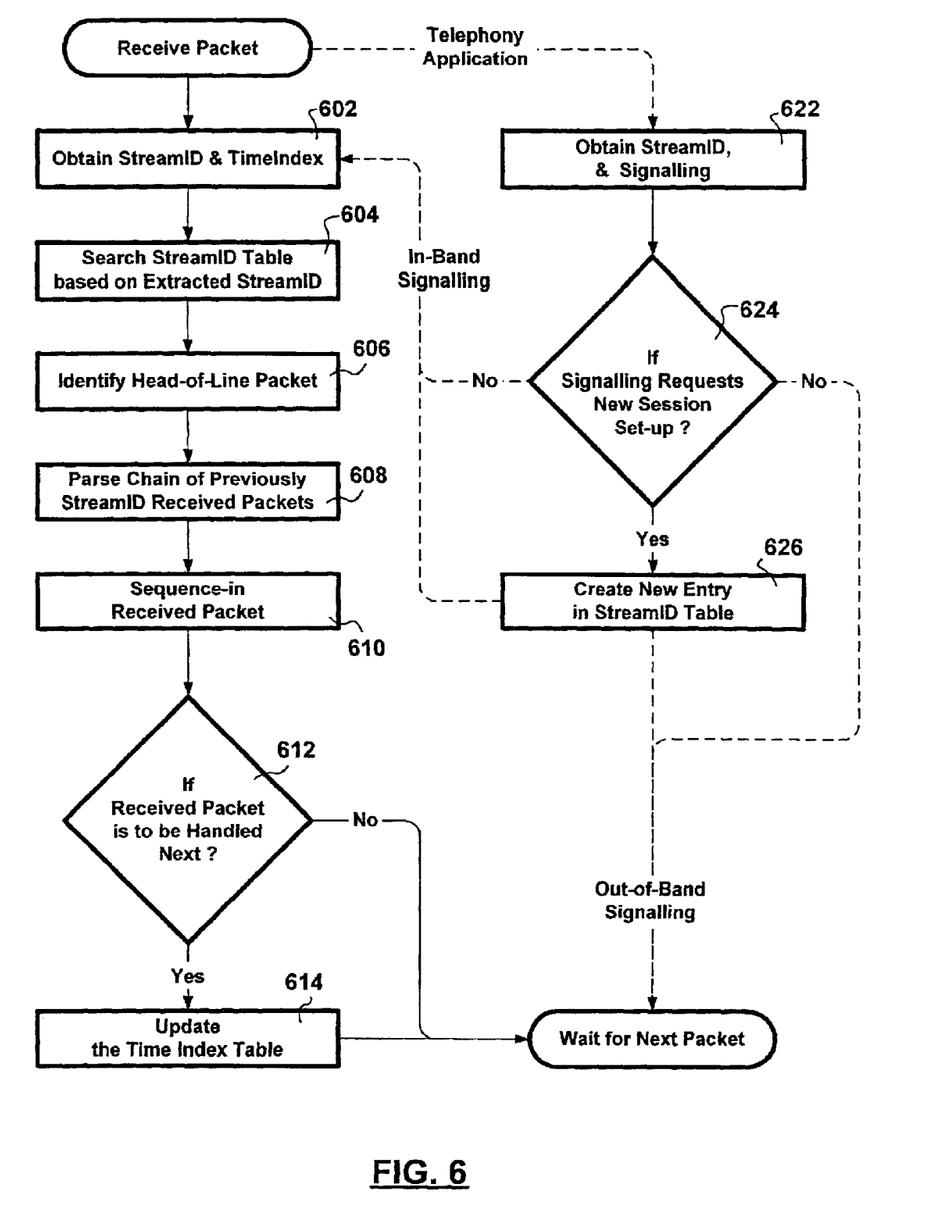
FIG. 6 is a schematic diagram showing generic process steps performed by packet classifier in accordance with an exemplary embodiment of the invention.

FIG. 6 is a schematic diagram showing, in accordance with an exemplary embodiment of the invention, generic process steps performed by packet classifier.

For each received packet, the packet classifier 302 obtains a streamID specification as well as a time index specification in step 602. The streamID specification may be extracted if present in the packet header or derived from routing information held in the packet header. The streamID table 360/460 is searched in step 604 using the streamID specification as a key. The streamID table search 604 results in identifying 606 a head-of-line packet associated with the streamID. A corresponding chain of previously received packets for the streamID is parsed 608. The received packet is sequenced 610 with respect to the previously received packets for the streamID.

It is likely that the packet just received is to be handled next, as determined in step 612, in which case the extracted time index information is used to schedule 614 subsequent handling thereof in the time index table 330.

It is to be understood that the generic steps described above may be adapted to process a variety of work units; the handled packets mentioned above representing exemplary work units.

As mentioned above, telephony applications require the set-up and teardown of telephone sessions. In order to perform such actions, the packet classifier 302, in inspecting received VoIP packets also extracts signaling information. Exemplary steps are shown in support of telephony session setup. If the extracted signaling information 622 represents a request for a new telephone session setup, fact ascertained in step 624, then a new entry 362 is created 626 in the streamID table 360/460.

Depending on the VoIP implementation, the signaling information used may include in-band signaling, out-of-band signaling, etc. In-band signaling is a technique by which signaling information is conveyed by VoIP packets carrying voice sample data. Out-of-band signaling is a technique by which signaling information is conveyed via dedicated packets. If in-band signaling is employed, packet pre-processing by the packet classifier 302 resumes from step 602.

Figure 7:
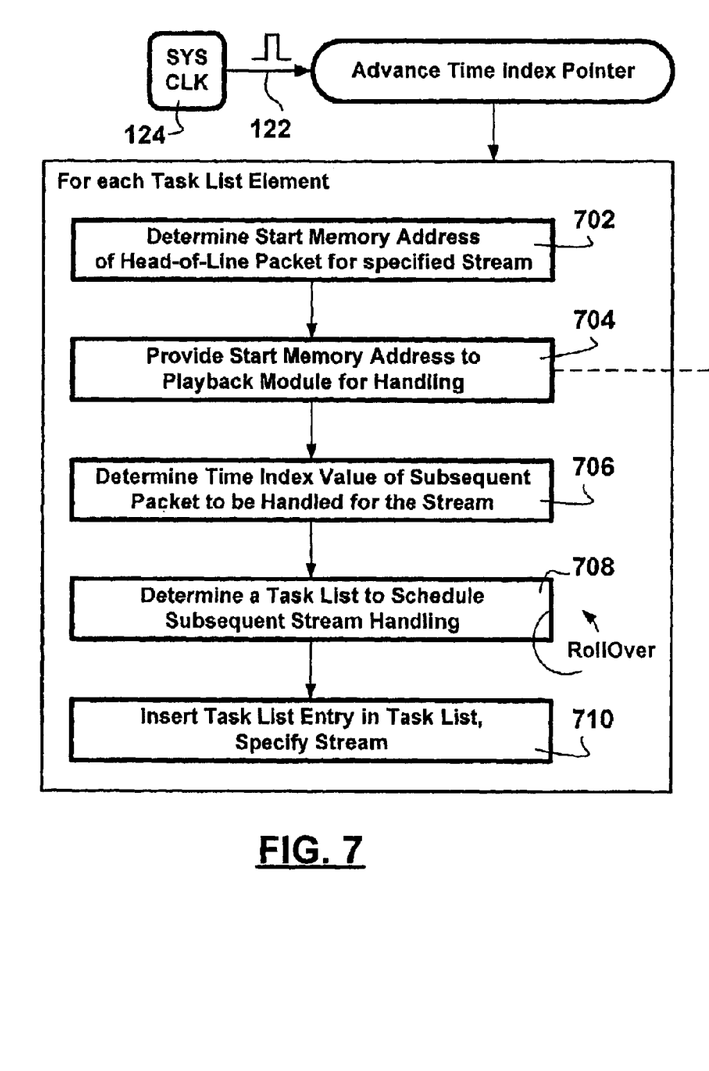
FIG. 7 is a schematic diagram showing generic process steps performed by a scheduler in accordance with an exemplary embodiment of the invention.

FIG. 7 is a schematic diagram showing, in accordance with an exemplary embodiment of the invention, generic process steps performed by a scheduler.

The scheduler 320 is triggered into operation by the 8 kHz clock signal 122. For each task list element 336, specifying a process to be handled, a start memory storage address of the corresponding head-of-line is determined in step 702. The start memory address is provided to the playback module for handling. The time index value of the subsequent packet to be handled for the stream is determined in step 706. The time index value of the subsequent packet is used to identify 708 a task list in which the stream is to be scheduled for handling again. A task list entry 336 for the stream is inserted 710 in the identified task list 334.

Figure 8:
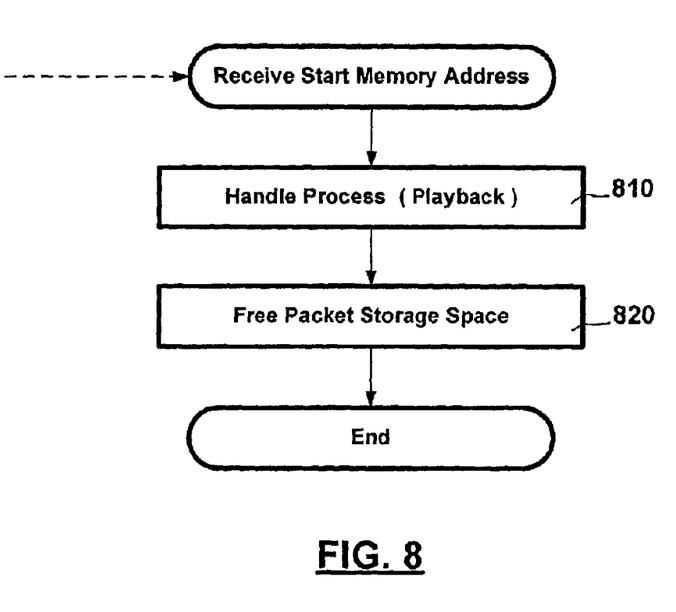
FIG. 8 is a schematic diagram showing generic process steps performed by a playback module in accordance with an exemplary embodiment of the invention.

FIG. 8 is a schematic diagram showing, in accordance with an exemplary embodiment of the invention. generic process steps performed by a playback module.

General actions taken by the playback module 140 include the handling of the processes. Being given the start memory address of identified packets for handling, the playback module, uses streamID information to play back 810 the voice sample data over the corresponding telephone session. Subsequent to the play back, the storage space associated with the corresponding packet is made available 820 for the storage of new received packets.

Figure 9:
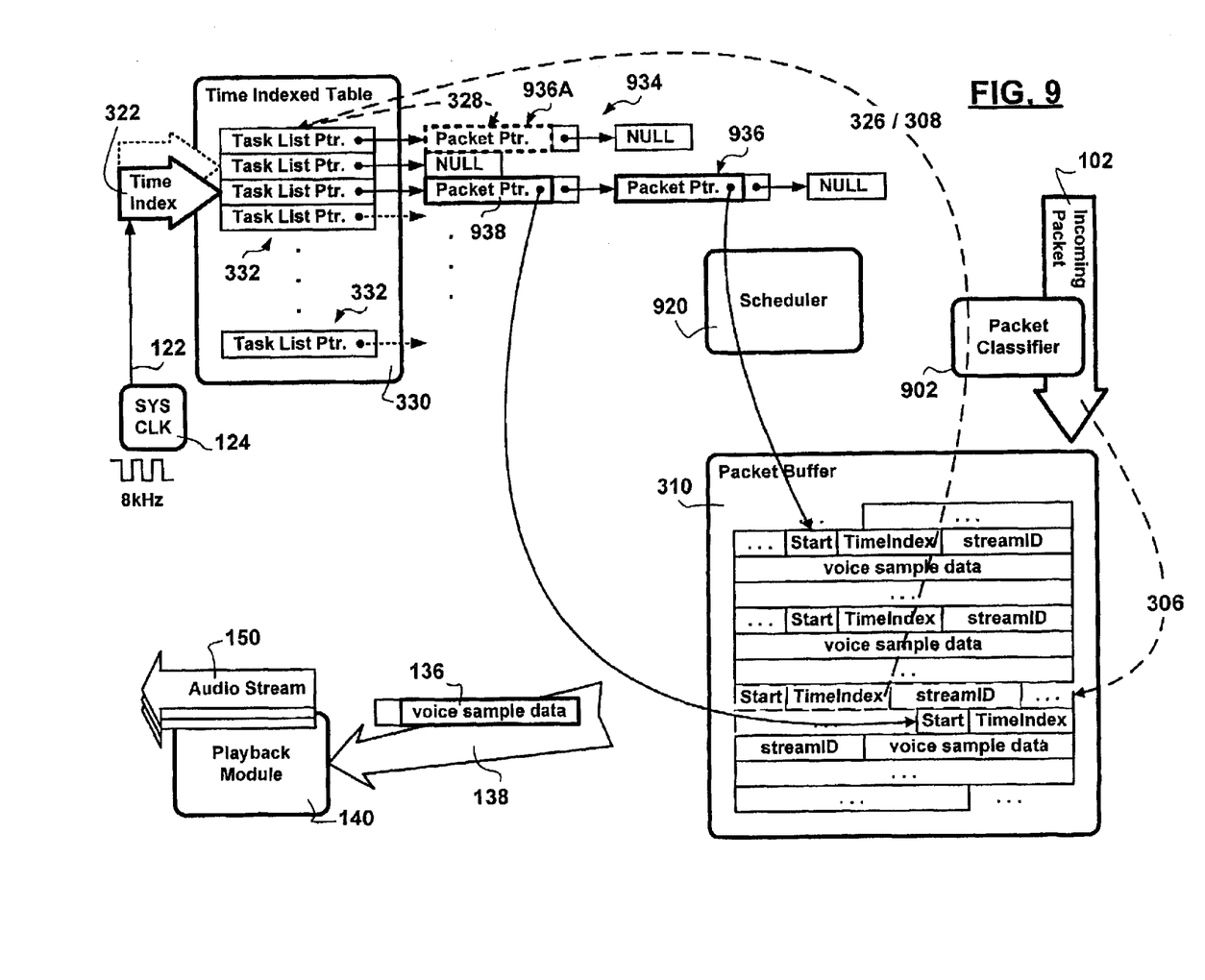
FIG. 9 is a schematic diagram showing yet another exemplary implementation of an apparatus scheduling a large number of processes for handling in accordance with yet another exemplary embodiment of the invention.

FIG. 9 is a schematic diagram showing, in accordance with yet another exemplary embodiment of the invention, yet another exemplary implementation of an apparatus scheduling a large number of processes for handling.

In accordance with this embodiment, the time indexed table 330 includes entries 332 specifying task list references (pointers) to corresponding packet lists 934. Each packet list 934 has task list elements 936 specifying start memory storage addresses of packets stored in the global packet buffer 310.

Figure 10:
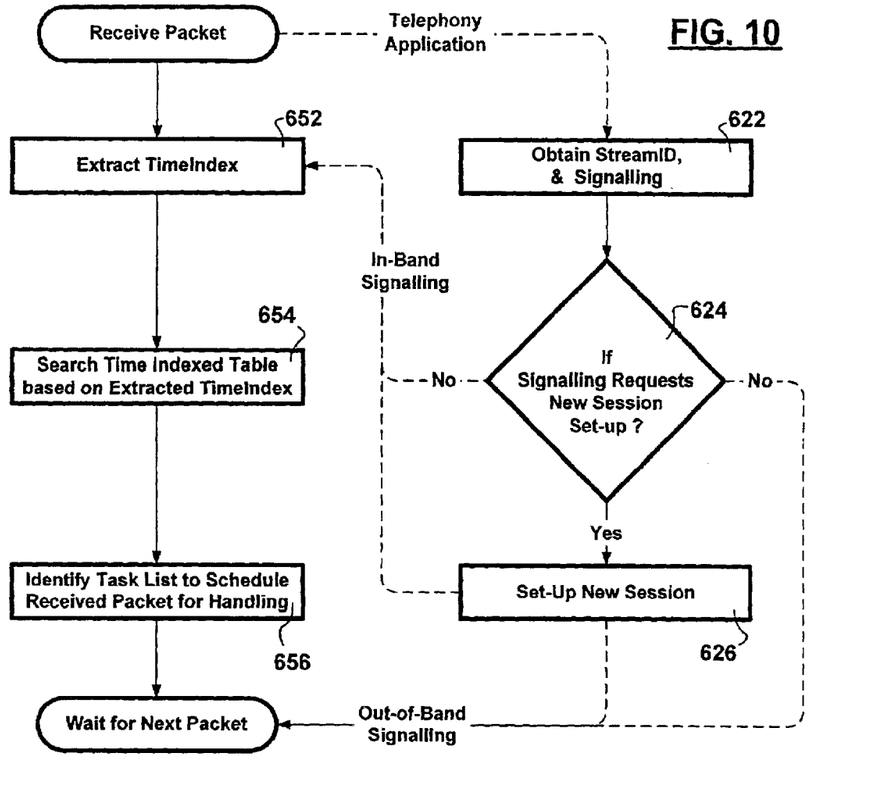
FIG. 10 is another schematic diagram showing generic process steps performed by packet classifier in accordance with another exemplary embodiment of the invention.

One of the advantages of this embodiment is derived from a simplification of the operation of the packet classifier 902. The packet classifier 902 in addition to storing 306 a received packet in the global packet buffer 310, as show in FIG. 10, schedules the received packet for handling. The packet classifier 902, extracts 652 a time index specification from the received packet. The time indexed table 330 is searched 654 based on the extracted time index to determine a task list entry 332 corresponding to a 125 µs interval in which to schedule the received packet for handling. A record 936A of a start memory storage address of the received packet is added 328 to the corresponding packet list 934. Each packet list 934 therefore specifies only which packets require handling during the corresponding 125 µs time interval.

Another advantage is derived from the scheduling of received packets without making use of streamID information thus reducing processing overheads. It will also be noted that the packets associated with any data stream are inherently scheduled to be handled in sequence even if these arrive out of sequence. Late arrived packets are handled in the same manner presented above.

It will be noted that if more than one packet per streamID is stored in the packet buffer 310, as it is typically the case, the number of task list entries 332 has to be increased. If packets carry 256 voice data samples or 32 ms of play back, by doubling the size of the time indexed table 330 from 256 entries to 512 entries it is possible for a telephone session to incur a maximum of 64 ms of delay. In practice such a delay is acceptable and such provisioning for the 64 ms delay may actually be beneficial to smooth out jitter effects. Jitter is the variation in the inter-arrival time of packets associated with a streamID. If more than 64 ms delay can be tolerated or needed, the size of the time indexed table 330 needs to be increased to prevent looping around and over described above.

Figure 11:
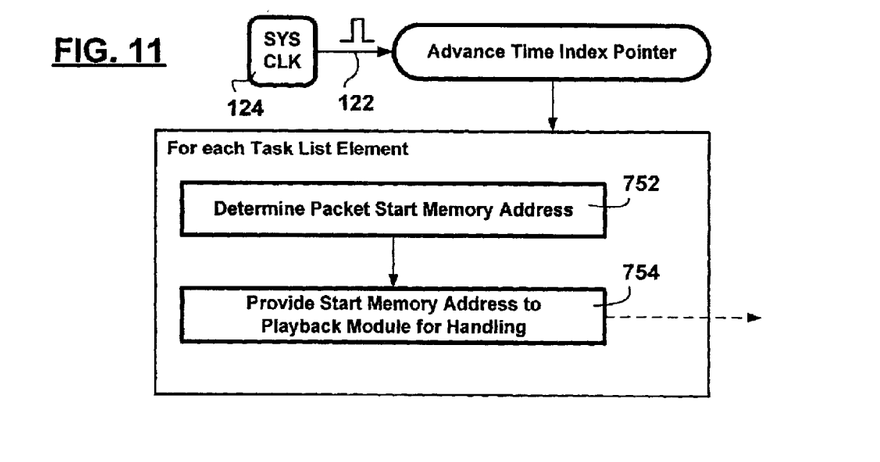
FIG. 11 is another schematic diagram showing generic process steps performed by a scheduler in accordance with another exemplary embodiment of the invention.

FIG. 11 is another schematic diagram showing, in accordance with another exemplary embodiment of the invention, generic process steps performed by a scheduler.

Scheduler 920, is triggered into operation by the clock signal 122. During each 125 μs time interval, the scheduler 920 operates on a packet list 934 specified by in a corresponding task list entry 332 in the time indexed table 330. For each task list element 936, the scheduler 920 determines 752 a start memory storage address of corresponding packet to be handled. The start memory storage address is provided to the playback module 140 for handling.

The scheduler 920 therefore is relieved from processing overheads, the entire processing power of the scheduler 920 being dedicated during the 125 μs time budget to provide the playback module 140 with references to packets requiring handling.

In accordance with an exemplary hardware implementation, the time index pointer 322 may be implemented as a counter register specifying sequential register addresses of registers 332 holding memory address specifications of the starting memory addresses of the storage location of corresponding task lists 336. The register addresses have a bit width. With the registers 332 stored sequentially, the counter register implementing the index pointer 322 may only specify most significant register 332 address bits in multiples of the bit width thereof.

Having described exemplary embodiments of the invention making reference to telephony applications, it is understood by persons of skill in the art that the apparatus and methods presented hereinabove may be employed in a variety of applications. The VoIP packets alluded to, represent exemplary work units which have to be scheduled for further processing in handling processes associated with the work units. The time indexed table 330 alluded to, represents an example of time indexed storage for a plurality of task lists while the time index pointer 332 is representative of a task list selector. The streamID table 360/460 alluded to is representative of a process roster. The playback unit 140 being exemplary of a work unit processor.

A variety of applications requiring scheduling may therefore be reduced to the above characterization and implemented using the above described techniques.

The embodiments presented are exemplary only and persons skilled in the art would appreciate that variations to the above described embodiments may be made without departing from the spirit of the invention. The scope of the invention is solely defined by the appended claims.

We claim:

1. A scheduling apparatus comprising:
   a. time indexed storage for retrievably storing a plurality of time sequenced task lists, each one of the plurality of task lists having at least one task list element;
   b. each task list element further comprises a specification of a head-of-line work unit of a list of time sequenced work units associated with a process, each work unit having a corresponding handling time, and a corresponding processing time duration;
   c. work unit storage for retrievably storing at least one work unit; and
   d. a scheduler initiating handling; each work unit specified in one of the plurality of task lists during a particular time interval corresponding to the work unit handling time, the work unit being processed for the corresponding processing time duration, the scheduler re-scheduling the handling of subsequent work units corresponding to the same process only after the expiration of the processing time duration of the currently handled work unit,
   wherein the handling of a plurality of work units corresponding to a process may include time gaps.

2. A scheduling apparatus as claimed in claim 1, further comprising a selector for selecting one of the plurality of task lists during the corresponding time interval.

3. A scheduling apparatus as claimed in claim 2, wherein the selector is responsive to a clock signal defining each time interval.

4. A scheduling apparatus as claimed in claim 1, wherein the time indexed storage includes a one of a time indexed table and a time indexed list.

5. A scheduling apparatus as claimed in claim 1, wherein the task list element further comprises a specification of a start memory storage address reference corresponding to a corresponding work unit.

6. A scheduling apparatus as claimed in claim 1, wherein the task list element further comprises a specification of a start memory storage address reference corresponding to the corresponding head-of-line work unit.

7. A scheduling apparatus as claimed in claim 6, wherein each work unit in the list of work units associated with the process further comprises a specification of a start memory storage address reference corresponding to a subsequent work unit.

8. A scheduling apparatus as claimed in claim 1, further comprising a process roster having roster entries specifying a plurality of processes to be scheduled for handling, each one of the plurality of process having an associated time sequenced list of work units.

9. A scheduling apparatus as claimed in claim 8, wherein each roster entry further comprises a specification of a start memory storage address reference corresponding to a corresponding head-of-line work unit of the list of time sequenced work units.

10. A scheduling apparatus as claimed in claim 8, further comprising a time sequenced list of work unit specifications, each work unit specification specifying a start memory storage address reference corresponding to a work unit.

11. A scheduling apparatus comprising:
    a. a time indexed table having task list entries, each task list entry referencing a corresponding task list, each task list further having task list elements specifying a group of processes from a plurality of processes to be handled during a corresponding time interval;
    b. a work unit storage buffer holding a plurality of work units;
    c. a process indexed table having process entries, each process entry further comprising a list of time sequenced work units associated therewith, each work unit specifying a handling time; and
    d. a scheduler parsing one task list during a corresponding time interval, to cause the initiation of handling of head-of-line work units corresponding to processes specified in the task list, once handling for each head-of-line work unit has been initiated, the handling time associated with a subsequent work unit is used to re-schedule the corresponding process in the time index table for subsequent handling.

12. A scheduling apparatus comprising:
  a. a time indexed table having time sequenced task list entries, each task list entry referencing a corresponding work unit list, each work unit list further having work unit list elements specifying a group of work units from a plurality of work units to be handled during a corresponding time interval;
  b. a work unit storage buffer holding a plurality of work units, each work unit specifying a handling time; and
  c. a scheduler parsing one work unit list during a corresponding time interval, to cause the initiation of handling of work units specified in the work unit lists, the handling time associated with each work unit is used to schedule for handling the work unit in a corresponding time sequenced work unit list associated with the time index table.

13. A method for scheduling a plurality of processes for handling comprising steps of:
  associating each one of a plurality of work units with a corresponding one of the plurality of processes;
  sequencing, for each one of the plurality of processes, the plurality of works units associated therewith according to corresponding time index specifications associated with the work units;
  selecting a task list from a plurality of time sequenced task lists, each task list specifying at least one of the plurality of processes to be handled during a time interval;
  initiating the handling of each process in the selected task list; and
  rescheduling each handled process for subsequent handling by associating the handled process with another one of the plurality of task lists based on the time index specifications associated with the work units associated with the handled process.

14. A scheduling method as claimed in claim 13, wherein selecting the task list, the method further comprises a step of: advancing a selector, for each time interval, to point to a subsequent task list of the plurality of time sequenced task lists.

15. A scheduling method as claimed in claim 13, wherein initiating the handling of each process, the method further comprises a step of: determining a start memory storage address reference corresponding to a head-of-line work unit associated with the process.

16. A scheduling method as claimed in claim 15, wherein initiating the handling of each process, the method further comprises a step of: providing the start memory storage address reference to a work unit processor.

* * * * *

UNITED STATES PATENT AND TRADEMARK OFFICE
CERTIFICATE OF CORRECTION

PATENT NO. : 7,085,704 B2 Page 1 of 1
APPLICATION NO. : 10/139644
DATED : August 1, 2006
INVENTOR(S) : Yik et al.

It is certified that error appears in the above-identified patent and that said Letters Patent is hereby corrected as shown below:

On the Cover:
Number (73) should read "Zarlink Semiconductor V.N. Inc.".

Signed and Sealed this

Twenty-first Day of November, 2006

JON W. DUDAS
*Director of the United States Patent and Trademark Office*